(12) United States Patent
Choi et al.

(10) Patent No.: US 7,450,613 B2
(45) Date of Patent: Nov. 11, 2008

(54) DIGITAL TRANSMISSION SYSTEM WITH ENHANCED DATA MULTIPLEXING IN VSB TRANSMISSION SYSTEM

(75) Inventors: In Hwan Choi, Seoul (KR); Kyung Won Kang, Seoul (KR); Kook Yeon Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 733 days.

(21) Appl. No.: 10/701,916

(22) Filed: Nov. 4, 2003

(65) Prior Publication Data

US 2004/0090997 A1 May 13, 2004

Related U.S. Application Data

(63) Continuation-in-part of application No. 09/933,206, filed on Aug. 20, 2001, now Pat. No. 6,760,077, and a continuation-in-part of application No. 09/933,353, filed on Aug. 20, 2001, now Pat. No. 6,947,487, and a continuation-in-part of application No. 09/933,280, filed on Aug. 20, 2001, now Pat. No. 7,010,038.

(30) Foreign Application Priority Data

Mar. 21, 2003 (KR) ........................ 10-2003-0017834

(51) Int. Cl.
*H04H 20/28* (2008.01)
*H04J 1/00* (2006.01)
*H04J 3/02* (2006.01)
*H04J 3/04* (2006.01)
*H04N 5/00* (2006.01)

(52) U.S. Cl. ................ 370/486; 370/487; 370/535; 370/537; 370/538; 370/539; 348/614

(58) Field of Classification Search ............ 370/535, 370/537, 538, 539, 486, 487, 491, 492, 498, 370/516, 503, 533, 536, 543–545; 348/614
See application file for complete search history.

(56) References Cited

U.S. PATENT DOCUMENTS

| | | | |
|---|---|---|---|
| 5,087,975 A | 2/1992 | Citta et al. | 348/21 |
| 5,233,630 A | 8/1993 | Wolf | 375/308 |
| 5,488,691 A | 1/1996 | Fuoco et al. | 714/52 |
| 5,555,024 A | 9/1996 | Limberg et al. | 348/473 |

(Continued)

FOREIGN PATENT DOCUMENTS

KR 2002-93930 12/2002

OTHER PUBLICATIONS

U.S. Appl. No. 60/198,014, Bretl et al.

*Primary Examiner*—Brian Nguyen
*Assistant Examiner*—Farah Faroul
(74) *Attorney, Agent, or Firm*—Lee, Hong, Degerman, Kang & Schmadeka (57) ABSTRACT

A digital Vestigial Sideband (VSB) transmission system and enhanced data multiplexing method are disclosed. When 1/2 enhanced data coded at a rate of 1/2 and 1/4 enhanced data at a rate of 1/4 are transmitted, timing jitter in Moving Picture Experts Group (MPEG) of Vestigial Sideband (VSB) receiver can be reduced and the size of input buffer in Moving Picture Experts Group (MPEG) decoder of the Vestigial Sideband (VSB) receiver can be reduced by multiplexing the 1/2 enhanced data packet and the 1/4 data packet at predetermined intervals. Multiplexing the 1/2 enhanced data packet and the 1/4 data packet by grouping increases the reception performance of the 1/4 enhanced data. Multiplexing the 1/2 enhanced data packet and the 1/4 data packet alternatively reduces the Moving Picture Experts Group (MPEG) timing jitter in the Vestigial Sideband (VSB) receiver and increases the reception performance of the 1/4 enhanced data.

40 Claims, 7 Drawing Sheets

U.S. PATENT DOCUMENTS

| | | | |
|---|---|---|---|
| 5,563,884 A | 10/1996 | Fimoff et al. | 370/391 |
| 5,600,677 A | 2/1997 | Citta et al. | 375/296 |
| 5,602,595 A | 2/1997 | Citta et al. | 348/495 |
| 5,629,958 A | 5/1997 | Wilming | 375/295 |
| 5,636,251 A | 6/1997 | Citta et al. | 375/341 |
| 5,636,252 A | 6/1997 | Patel et al. | 375/295 |
| 5,706,312 A | 1/1998 | Wei | 375/298 |
| 5,831,690 A | 11/1998 | Lyons et al. | 375/240.28 |
| 5,923,711 A | 7/1999 | Wilming | 375/287 |
| 5,946,047 A | 8/1999 | Levan | 348/473 |
| 6,075,569 A | 6/2000 | Lee et al. | 348/554 |
| 6,208,643 B1 | 3/2001 | Dieterich et al. | 370/389 |
| 6,490,002 B1 | 12/2002 | Shintani | 348/569 |
| 6,519,298 B1 | 2/2003 | Kim | 375/343 |
| 6,690,738 B1 | 2/2004 | Swenson et al. | 375/265 |
| 6,697,098 B1 | 2/2004 | Wang | 348/21 |
| 6,708,149 B1 | 3/2004 | Turin | 704/240 |
| 6,724,832 B1 | 4/2004 | Hershberger | 375/301 |
| 6,760,077 B2 | 7/2004 | Choi et al. | 348/614 |
| 6,763,025 B2 | 7/2004 | Leatherbury et al. | 439/35 |
| 6,788,710 B1 | 9/2004 | Knutson et al. | 370/535 |
| 6,952,238 B2 * | 10/2005 | Koo | 348/614 |
| 6,993,062 B1 * | 1/2006 | Kong et al. | 375/130 |
| 7,038,732 B1 * | 5/2006 | Limberg et al. | 348/614 |
| 2002/0085632 A1 | 7/2002 | Choi et al. | 375/240.01 |
| 2002/0154247 A1 * | 10/2002 | Ghosh et al. | 348/614 |
| 2002/0172231 A1 * | 11/2002 | Claxton et al. | 370/537 |
| 2004/0240590 A1 | 12/2004 | Cameron et al. | 375/240 |

* cited by examiner

| |
|---|
| 1/2 enhanced |
| 1/2 enhanced |
| 1/2 enhanced |
| 1/2 enhanced |
| 1/4 enhanced |
| 1/4 enhanced |
| 1/2 enhanced |
| 1/2 enhanced |
| 1/2 enhanced |
| 1/4 enhanced |

FIG. 6B

| |
|---|
| 1/2 enhanced |
| 1/2 enhanced |
| 1/2 enhanced |
| 1/2 enhanced |
| 1/2 enhanced |
| 1/2 enhanced |
| 1/2 enhanced |
| 1/2 enhanced |
| 1/4 enhanced |
| 1/4 enhanced |

FIG. 6C

DIGITAL TRANSMISSION SYSTEM WITH ENHANCED DATA MULTIPLEXING IN VSB TRANSMISSION SYSTEM

CROSS-REFERENCE TO RELATED APPLICATIONS

Pursuant to 35 U.S.C. § 119 (a), this application claims the benefit of earlier filing date and right of priority to Korean Application No. 17834/2003, filed on Mar. 21, 2003, the contents of which are hereby incorporated by reference herein in their entirety.

This application is also a continuation-in-part of application Ser. Nos. 09/933,206 now U.S. Pat. No. 6,760,777; 09/933,353 now U.S. Pat. No. 6,947,487; 09/933,280 now U.S. Pat. No. 7,010,038 all filed on Aug. 20, 2001 which are hereby incorporated by reference in their entirety.

BACKGROUND OF THE INVENTION

1. Field of the Invention

The present invention relates to a digital VSB (Vestigial Sideband) transmission system being compatible with conventional (Advanced Television Systems Committee) (ATSC) 8-VSB transmission system and transmitting separate enhanced data, and more particularly, to a method of multiplexing a plurality of enhanced data coded at different code rate in a VSB transmission system.

2. Discussion of the Related Art

The United States of America has employed ATSC 8T-VSB (8 Trellis-Vestigial Sideband) as a standard since 1995, and has been broadcasting in the ATSC 8T-VSB since the later half of 1998. South Korea also has employed the ATSC 8T-VSB as a standard. South Korea started test broadcasting in May 1995, and has since August 2000 put in place a regular test broadcasting system.

Figure 1:
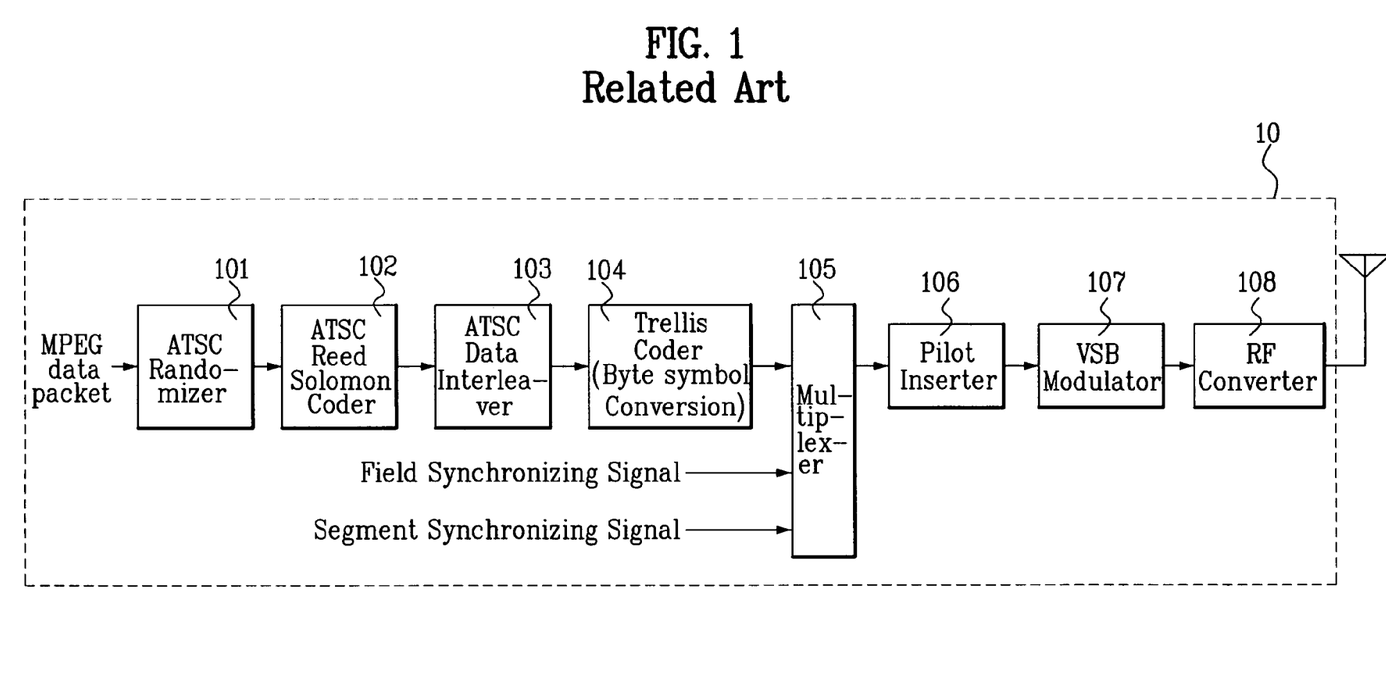
FIG. 1 is a block diagram illustrating a ATSC 8VSB transmission system.

FIG. 1 illustrates a block diagram of a related art ATSC 8T-VSB-transmission system 10 ("VSB transmission system"). In FIG.1, the ATSC data randomizer 101 randomizes Moving Picture Experts Group (MPEG) video/audio data to a Reed-Solomon coder 102. The Reed-Solomon coder 102 of the VSB transmission system 10 is used for subjecting the output data of the data randomizer 101 to Reed-Solomon coding and adding a 20-byte parity code to the output data. The data interleaver 103 interleaves the output data of the Reed-Solomon coder 102 and sends the output data of the data interleaver 103 to a trellis coder 104 for converting the output data of the data interleaver 103 from byte form into symbol form and for subjecting it to trellis coding. A multiplexer 105 is used for multiplexing a symbol stream from the trellis coder 104 and synchronizing signals. Then a pilot inserter 106 inserts pilot signals into the symbol stream received from the multiplexer 105. After the pilot signal has been inserted into the symbol stream by the pilot inserter 106, the output is subjected to a VSB modulator 107. The VSB modulator 107 modulates the symbol stream from the pilot inserter 106 into an 8 VSB signal of an intermediate frequency band. Finally, there is a RF (Radio Frequency) converter 108 for converting the signal of an intermediate frequency band from the VSB modulator 107 into a signal of a RF band signal, and for transmitting the signal to a reception system through an antenna.

The ATSC 8VSB transmission system transmits MPEG-2 digital video and digital audio data for HD (High Definition) broadcasting. As technologies for processing digital signals develop and the use of the Internet increases, the trend currently is to integrate digitized home appliances, the personal computer, and the Internet into one comprehensive system.

Therefore, in order to satisfy the variety of the demands of users, there is a need to develop a communication system that facilitates the addition and transmission of a variety of supplemental data to the video and audio data through the digital broadcasting channel.

Supplemental data broadcasting is different from general video and audio data in that it requires a lower error ratio in transmission. For general video and audio data, errors imperceptible to the human eye or ear are inconsequential. In contrast, for supplemental data, even one bit of error in the supplemental data (which may include program execution files, stock information, and other similar information) may cause a serious problem. Therefore, a transmitting technology of encoding the supplemental data into a specific code one more time had been applied for a patent by the same applicant of the present invention (Pat No.: P00-83533, filed on Dec. 28, 2000).

In general, the supplemental data is transmitted by a time division system on a channel similar to the MPEG video and audio data. After the incorporation of digital broadcasting, there has already been a widespread emergence in the home appliance market of receivers equipped to receive ATSC VSB digital broadcast signals. These products receive MPEG video and audio data only. Therefore, it is required that the transmission of supplemental data on the same channel as the MPEG video and audio data has no adverse influence on the existing receivers that are equipped to receive ATSC VSB digital broadcasting.

The above situation is defined as ATSC VSB backward compatibility, and the supplemental data broadcasting system must be a system that is backward compatible with the existing ATSC VSB communication system.

SUMMARY OF THE INVENTION

Accordingly, the present invention is directed to a digital VSB transmission system that substantially obviates one or more problems due to limitations and disadvantages of the related art.

An object of the present invention is to provide a digital VSB transmission system, in which a plurality of supplemental data, encoded to different code rate, are multiplexed and transmitted, for being in suitable for a supplemental data transmission system, and being compatible with a related art ATSC 8VSB transmitting system.

Another object of the present invention is to provide a supplemental data multiplexing method, for being compatible with a related art ATSC 8VSB transmission system, in which supplemental data encoded at first rate, and supplemental data encoded at second rate is multiplexed.

Another object of the present invention is to provide a supplemental data multiplexing method, for minimizing MPEG timing jitter in an MPEG decoder of ATSC 8 VSB receiver, in which supplemental data encoded at first rate and supplemental data encoded at second rate is multiplexed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a VSB transmission system for use with main data and first and second enhanced data comprises a multiplexer unit comprising at least first and second multiplexers, the multiplexer for multiplexing a first enhanced data packet and a second enhanced data packet according to a first predetermined multiplexing rule, subjecting the multiplexed first and second enhanced data packet to a forward error correction code (for example Reed-Solomon code) to produce formatted enhanced data, and the second multiplexer for multiplexing the formatted enhanced data and the main data in response to a second predetermined multiplexing rule; a first encoder in communication with the multiplexer unit for performing at least one of data randomizing, parity supplementing and data interleaving to a data packet output from the main and enhanced data multiplexer unit; a symbol processor in communication with the first encoder for converting the data packet data output from the first encoder to a symbol, encoding only enhanced data symbol at rate of 1/L, L being an integer equal to or larger than 2, and converting the symbol to byte unit data; a first decoder for deinterleaving the byte unit data output from the symbol processor, and removing parity added to the first encoder from the deinterleaved data; and a VSB transmitter for performing trellis coding, parity supplementing and data interleaving to the data output from the first decoder to produce a converted data packet and transmitting the converted data packet.

According to one aspect of the invention, the first enhanced data is encoded at a code rate of 1/M, M being an integer equal or larger than 2, and the second enhanced data is encoded at a code rate of 1/N, N being an integer greater than M.

According to another aspect of the invention, the multiplexer unit includes a pre-processor for multiplexing the first enhanced data and the second enhanced data according to the first predetermined multiplexing rule that is at least responsive to a field synchronizing signal and a location control signal that corresponds to locations of the first and the second enhanced data.

According to still another aspect of the invention, the multiplexer unit comprises a main data buffer for temporarily storing the main data inputted in a packet of X-byte unit and generating a main data packet; a first enhanced data buffer for storing the first enhanced data inputted in a packet of X-byte unit; a second enhanced data buffer for storing the second enhanced data inputted in a packet of X-byte unit; a preprocessor for multiplexing the first enhanced data output from the first enhanced data buffer, and the second enhanced data output from the second enhanced data buffer into a packet unit according to the predetermined multiplexing rule, and converting the data to a MPEG transport packet format to generate an enhanced data packet; and the second multiplexer for multiplexing the main data packet output from the main data buffer and the enhanced data packet output from the pre-processor into the segment unit according to a second predetermined multiplexing rule.

According to a preferred embodiment, the pre-processor comprises a first packet converter for converting the first enhanced data inputted in the packet of X-byte unit into a first enhanced data packet of Y-byte unit; a second packet converter for dividing the second enhanced data inputted in the packet of X-byte unit into a second enhanced data packet of Y-byte unit; the first multiplexer for multiplexing the first and second enhanced data packets of Y-byte unit, output from the first and second packet converters, in response to multiplexing information in a field synchronizing signal, and generating second multiplexed enhanced data; an error correction coder and data interleaver for performing forward error correction coding to the second multiplexed enhanced data and generating interleaved enhanced data; a null bit inserter for inserting at least one null bit to the interleaved enhanced data; and an MPEG header inserter for inserting an MPEG header to data output from the null bit inserter.

According to another aspect of the invention, a number of the first enhanced data packets, encoded at a code rate of 1/M and multiplexed in one VSB data field, is defined as 'H', and a number of the second enhanced data packets, encoded at a code rate of 1/N, is defined as 'Q', such that the first and the second enhanced data packets are multiplexed in one data field in accordance with $0 \leq (MH+NQ) \leq K$, wherein K is a number of data segments in one data field.

According to further aspect of the invention, the first multiplexer multiplexes the first and second data packets at a uniform interval. Alternatively, the first multiplexer multiplexes each second enhanced data packet per Int(H/Q) numbered first enhanced data packets at the uniform interval if Q is smaller than H. Also, the first multiplexer may multiplex each first enhanced data packet per Int(Q/H) numbered second enhanced data packets at the uniform interval if H is smaller than Q. Also, the first multiplexer may perform the multiplexing process by separately grouping the first and enhanced data packets in one data field.

The first multiplexer alternately multiplexes the first and second enhanced data packets. Alternatively, the first multiplexer alternately multiplexes the first and second enhanced data packets, and multiplexes and outputs only the second enhanced data packet when one of the enhanced data packets is completely multiplexed.

According to one aspect of the invention, information for the number of the first and second enhanced data packets, transmitted in one data field, and information for the predetermined multiplexing rule of the first and second multiplexer respectively are inserted into a reserved bit of a field synchronizing segment as enhanced data multiplexing information.

According to another aspect of the invention, the null bit inserter outputs 2 bytes encoded at a code rate of ½ by inserting a null bit in between each bit if the first enhanced data of 1 byte is inputted, and the null bit inserter outputs 4 bytes encoded at a code rate of ¼ by repeating each bit twice, and inserting a null bit in between each bit if the second enhanced data of 1 byte is inputted. In addition, the symbol processor performs ½ convolutional encoding to information bit of enhanced data, for generating parity bit, and then outputs information bit, which is not convolutionally encoded, as a high bit of trellis coder, and the parity bit as a low bit in place of the inserted null bit.

According to another embodiment of the present invention, a method for combining first and second enhanced data with main data in a VSB transmission system comprises multiplexing the first and the second enhanced data in a multiplexer unit comprising at least first and second multiplexers, the first multiplexer for multiplexing a first enhanced data packet and a second enhanced data packet according to a first predetermined multiplexing rule, subjecting the multiplexed first and second enhanced data packet to a forward error correction code to produce formatted enhanced data, and the second multiplexer for multiplexing the formatted enhanced data and the main data in response to a second predetermined multiplexing rule; encoding an output of the multiplexer unit in a first encoder in communication with the multiplexer unit for performing at least one of data randomizing, parity supplementing and data interleaving to a data packet output from the main and enhanced data multiplexer unit; converting the data packet data output from the first encoder to a symbol in a symbol processor, encoding only enhanced data symbol at rate of 1/L, L being an integer equal to or larger than 2, and converting the symbol to byte unit data; and decoding the byte unit data in a first decoder by deinterleaving the byte unit data output from the symbol processor, and removing parity added to the first encoder from the deinterleaved data.

According to another embodiment of the present invention, a multiplexer unit of a VSB transmission system for use with main data and first and second enhanced data comprises a first enhanced data buffer for storing first enhanced data inputted in a packet of X-byte unit; a second enhanced data buffer for storing second enhanced data inputted in a packet of X-byte unit; a pre-processor comprising a first multiplexer for multiplexing the first enhanced data output from the first enhanced data buffer, and the second enhanced data output from the second enhanced data buffer into a packet unit according to a first predetermined multiplexing rule, and converting the data to a MPEG transport packet format to generate an enhanced data packet; and a second multiplexer for multiplexing main data and the enhanced data packet output from the pre-processor into the segment unit according to a second predetermined multiplexing rule.

According to one aspect of the invention, the pre-processor comprises a first packet converter for converting the first enhanced data inputted in the packet of X-byte unit into a first enhanced data packet of Y-byte unit; a second packet converter for dividing the second enhanced data inputted in the packet of X-byte unit into a second enhanced data packet of Y-byte unit; the first multiplexer for multiplexing the first and second enhanced data packets of Y-byte unit, output from the first and second packet converters, in response to multiplexing information in a field synchronizing signal, and generating second multiplexed enhanced data; an error correction coder and data interleaver for performing forward error correction coding to the multiplexed enhanced data and generating interleaved enhanced data; a null bit inserter for inserting at least one null bit to the interleaved enhanced data; and an MPEG header inserter for inserting an MPEG header to data output from the null bit inserter.

According to another aspect of the invention, a number of the first enhanced data packets, encoded at a code rate of 1/M and multiplexed in one VSB data field, is defined as 'H', and a number of the second enhanced data packets, encoded at a code rate of 1/N, is defined as 'Q', such that the first and the second enhanced data packets are multiplexed in one data field in accordance with $0 \leq (MH+NQ) \leq K$, wherein K is a number of data segments in one data field.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 2:
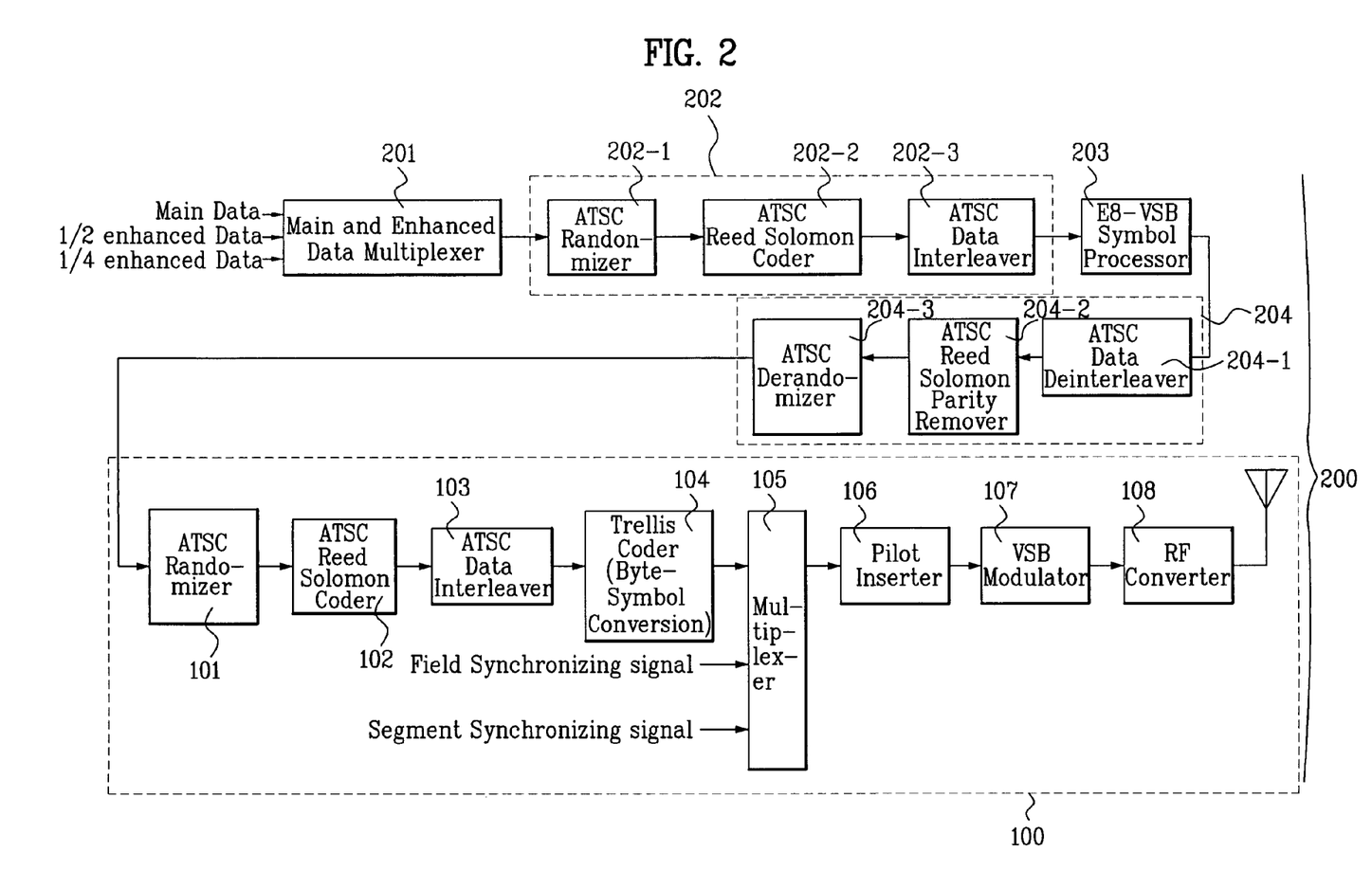
FIG. 2 is a block diagram illustrating ATSC 8VSB transmission system according to a preferred embodiment of the present invention.

FIG. 2 is a block diagram showing a VSB transmission system 250 in accordance with a preferred embodiment of the present invention. Input data of the VSB transmission system is divided into main data and supplemental data. The main data include MPEG-2 video and digital audio data. The supplemental data, which is also called enhanced data for convenient description, include supplemental service data multiplexed with the main data.

The VSB transmission system 200 transmits widespread MPEG-4 video and various supplemental data, e.g., program execution files, stock information, etc., or conventional MPEG-2 video and audio data through said enhanced data. Preferably, the enhanced data incorporate additional error correction, and the ½ and ¼ enhanced data include additionally encoded data at the code rates of ½ and ¼, respectively. The enhanced data, compared to the main data, performs better reception and is more resistant to noise generated from channel and interference caused from multi paths. Hereinafter, for convenience of explanation and as an example, the enhanced data encoded at a code rate of ½ is called ½ enhanced data and the enhanced data encoded at a code rate of ¼ is called ¼ enhanced data. The enhanced data of other coding rate may also be used with the present invention.

The VSB transmission system 200 in FIG. 2 is designed not to impact a conventional VSB receiver receiving conventional ATSC 8VSB, and the amount of enhanced data multiplexed with the main data can be changed, if necessary.

In FIG. 2, the VSB transmission system 200 includes a main and enhanced data multiplexer or multiplexer unit 201 for multiplexing ½ enhanced data and ¼ enhanced data in packet unit, and multiplexing the multiplexed enhanced and main data in segment unit. A first encoder 202 has a randomizer 202-1, Reed Solomon coder 202-2 and a data interleaver 202-3 connected to an output end of the multiplexer in order, for sequentially performing data randomizing, Reed-Solomon coding and data interleaving to the data packet output from the main and enhanced data multiplexer 201. A Enhanced 8-Vestiqal Sideband (E8-VSB) symbol processor 203 converts the interleaved byte-unit data output from the first encoder 202 to a symbol, performing convolutional encoding on only enhanced data symbol, and converting the symbol to byte unit data. A first decoder 204 performs data deinterleaving, Reed-Solomon parity removing and derandomizing on the byte unit data output from the symbol processor 203. The first decoder 201 comprises a byte deinterleaver 204-1, Reed-Solomon parity remover 204-2 and derandomizer 204-3. An 8VSB transmitter 100 performs Reed-Solomon coding, data interleaving and trellis coding on data from which the Reed-Solomon parity is removed in the first decoder 204.

The structure of the 8VSB transmitter 100 is similar to that shown in FIG. 1. However, the randomizer 101 may be omitted. Also, the derandomizer 204-3 of the first decoder 204 may also be omitted. In other words, both the data derandomizer 204-3 of the first decoder 204 and a randomizer 101 of the 8 VSB transmitter 100 may be used, or may be omitted together.

The preferred embodiment illustrates the main and enhanced data multiplexer 201 in FIG. 2. The main and enhanced data multiplexer 201 multiplexes the ½ enhanced data and the ¼ enhanced data into packet units and multiplexes the multiplexed enhanced data and main data in segment unit. A frame to display a picture in the VSB system comprises two data fields. Each data field has 312 data segments and one field-synchronizing segment. One data segment has data segment synchronizing signals of four symbol and 828 symbol data.

Figure 3:
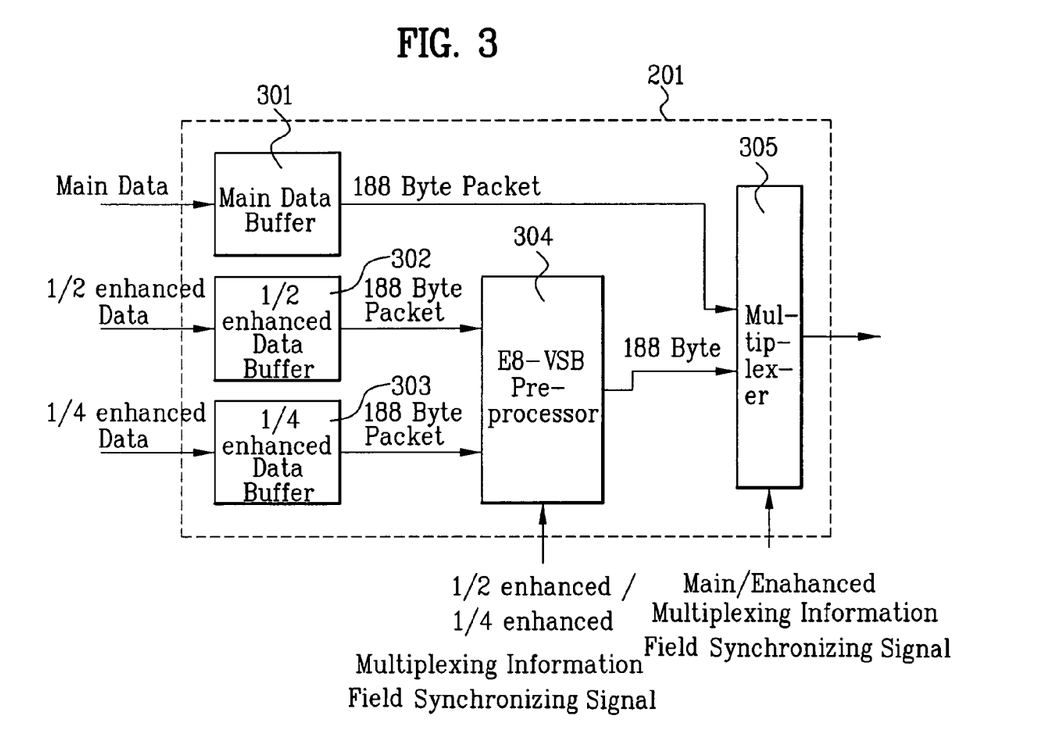
FIG. 3 is a detailed block diagram of a main and enhanced data multiplexer shown in FIG. 2.

FIG. 3 is a detailed block diagram of the main and enhanced data multiplexer 201 which includes a main data buffer 301 for storing main data inputted in a packet of 188 byte unit, a ½ enhanced data buffer 302 for storing ½ enhanced data, a ¼ enhanced data buffer 303 for temporarily storing ¼ enhanced data inputted in a packet of 188 byte unit, an enhanced data pre-processor 304 for multiplexing the ½ enhanced data outputted from the ½ enhanced data buffer 302 and the ¼ enhanced data outputted from the ¼ enhanced data buffer 303 in packet unit according to a predetermined rule, and converting them into data having the same structure as MPEG transport packet of the main data. The enhanced data multiplexer 201 also includes a multiplexer 305 multiplexing main data packet outputted from the main data buffer 304 and the enhanced data packet outputted from the enhanced data pre-processor 304 according to a predetermined rule.

In FIG. 3, the main data is inputted to the main data buffer 301 in 188 byte packet unit, ½ enhanced data is inputted to the ½ enhanced data buffer 302 in 188 byte packet unit, and ¼ enhanced data is inputted to the ¼ enhanced data buffer 304. The enhanced data pre-processor 304 multiplexes the ½ enhanced data outputted from the ½ enhanced data buffer 302 and the ¼ enhanced data outputted from the ¼ enhanced data buffer 303 according to a predetermined rule (described below), and converts the multiplexed enhanced data to the same structure as MPEG transport packet of main data and outputs the data to the multiplexer 305. The multiplexer 305 multiplexes the main data packet outputted from the main data buffer 301 and the enhanced data packet outputted from the enhanced pre-processor 304 according to main and enhanced data multiplexing information preferably included in the field synchronizing signal.

In the VSB transmission system 200, if the number of enhanced data packet to be transmitted to one VSB data field is determined, the main and enhanced data multiplexing information related to multiplexing rule and number of data transmission packet is inserted to a reserved bit in the field synchronizing segment and transmitted to the multiplexer 305 as well as to the VSB receiver for performing exact inverse multiplexing thereof.

For example, the multiplexer 305 multiplexes the main data and the enhanced data in 3:1 rate by allocating one enhanced data segment per 3 segments of main data, or in 1:1 rate by allocating segment to main data and enhanced data, alternatively.

Figure 4:
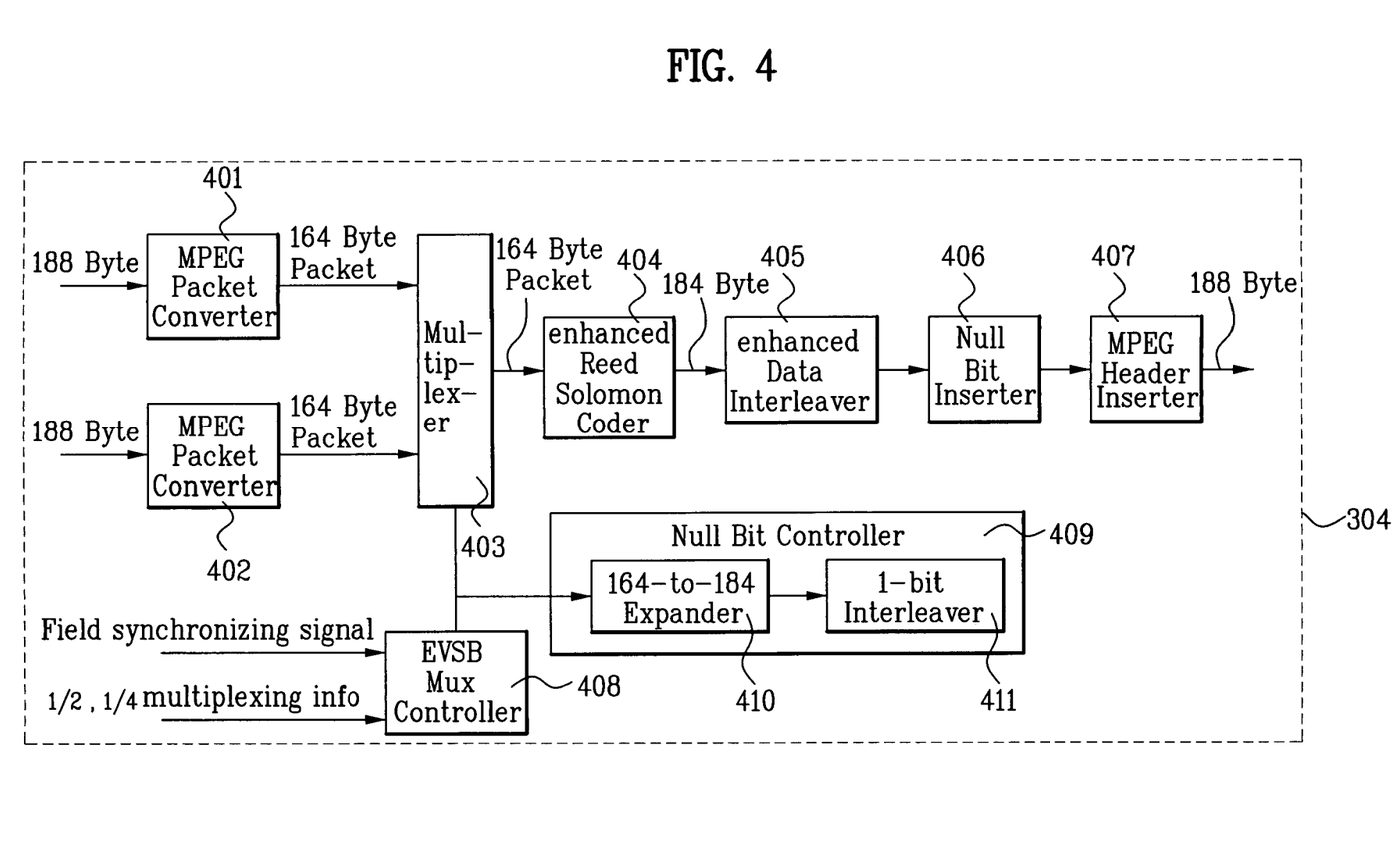
FIG. 4 is a detailed block diagram of an enhanced data pre-processor according to a preferred embodiment of the present invention.

FIG. 4 is a detailed block diagram of the enhanced data pre-processor 304 comprising a ½ packet converter 401 for converting the ½ enhanced data inputted in the 188 byte packet unit into the 164-byte packet unit, and outputting the converted data, a ¼ packet converter 402 for converting the ¼ enhanced data inputted in the 188-byte packet unit into the 164-byte packet unit. The pre-processor 304 also includes a multiplexer 403 for multiplexing the 164 byte packet unit of ½ enhanced data outputted from the ½ packet converter 401 and ¼ enhanced data outputted from the ¼ packet converter 402 into a packet unit according to the enhanced data multiplexing information. A Reed-Solomon coder 404 Reed-Solomon codes the multiplexed enhanced data in the multiplexer 403, and adds a 20 byte parity code. A data interleaver 405 for changes the order of data outputted from the Reed-Solomon coder 404. A null bit inserter 406 inserts null bits corresponding to the ½ enhanced data or ¼ enhanced data outputted from the data interleaver 405. A MPEG header inserter 407 inserts a MPEG header to the enhanced data having null bit data.

The ½ packet converter 401 in FIG. 4 converts the ½ enhanced data inputted in the 188-byte packet unit into the 164-byte packet unit and outputs to the multiplexer 403. The ¼ packet converter 402 converts the ¼ enhanced data inputted in the 188-byte packet unit into the 164-byte unit without data change and outputs to the multiplexer 403. The multiplexer 403 multiplexes the ½ enhanced data and the ¼ enhanced data converted into the 164-byte packet unit according to the supplemental multiplexing information in the field-synchronizing segment and outputs to the Reed-Solomon coder 404. The multiplexing rule for the multiplexer 403 will be described later.

The Reed-Solomon coder 404 performs Reed-Solomon coding on the multiplexed 164 byte enhanced data and adds the 20-byte parity code so as to convert the 164 byte enhanced data into 184 byte packet unit. As an example of the Reed Solomon coding, there are N=184, payload K=164 and error correction capability T=10. Galois field and generation polynomial of the encoder is the same as that of the Reed-Solomon coder 102. The N, K, T of the Rees Solomon 404 may be changed. For example, code of N=184, K=154, T=15 may be used, or N=92, K=82, T=5 may be used. Alternatively, other codes may be used in lieu of the Reed Solomon Code.

The output of the Reed-Solomon coder 404 is outputted to the data interleaver 405. The interleaver 405 interleaves the enhanced data having the parity code to improve resistance to burst noise and outputs the data to the null bit inserter 406 to expand packet. The null bit is inserted to the enhanced data for better reception in severe channel impairments.

Referring to FIG. 4, the Enhanced Vestigial Sideband (EVSB) multiplexer (Mux) controller 408 generates control signals which are used in the multiplexer 403 and the null bit controller 409. This control signals are generated in response to the field synchronizing signal and the ½ and ¼ multiplexing information whose rule will be described in detail later. The multiplexer 403 can select which one of two inputs is outputted with in response to the control signal received from the EVSB mux controller 408.

Preferably, the null bit controller 409, in response to a control signal received from the EVSB mux controller 408, generates a null bit control signal which informs the null bit inserter 406 whether its input data is ½ or ¼ enhanced data so that the null bit inserter 406 can insert null bits corresponding to a given code rate. According to the preferred embodiment, the null bit controller 409 comprises an 164-to-184 expander 410 and an 1-bit interleaver 411 so that the input data of the null bit inserter 406 is synchronized with its control signal.

The 164-to-184 expander 410 preferably generates 184 bits of all-one or all-zero in response to the input control signal from the EVSB mux controller 408. The 1-bit interleaver 411 receives the output control signal of the expander 410 and performs interleaving similar to the enhanced data interleaver 405.

Figure 5A:
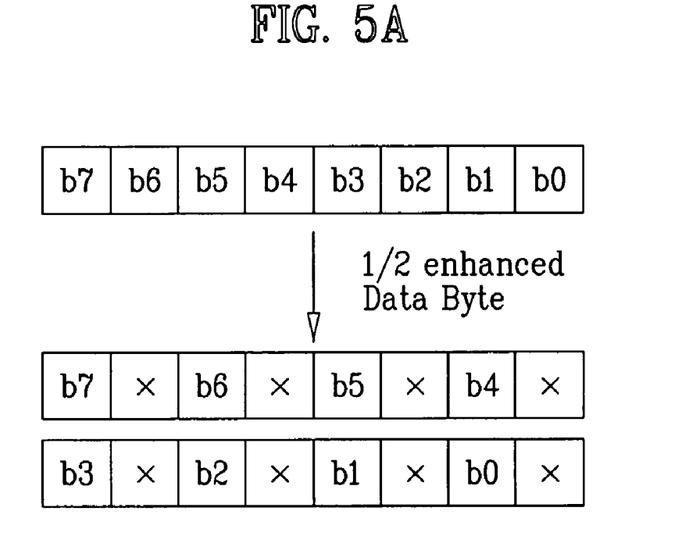
FIG. 5A is an example illustrating null bit inserted into ½ enhanced data according to the preferred embodiment of the present invention.
Figure 5B:
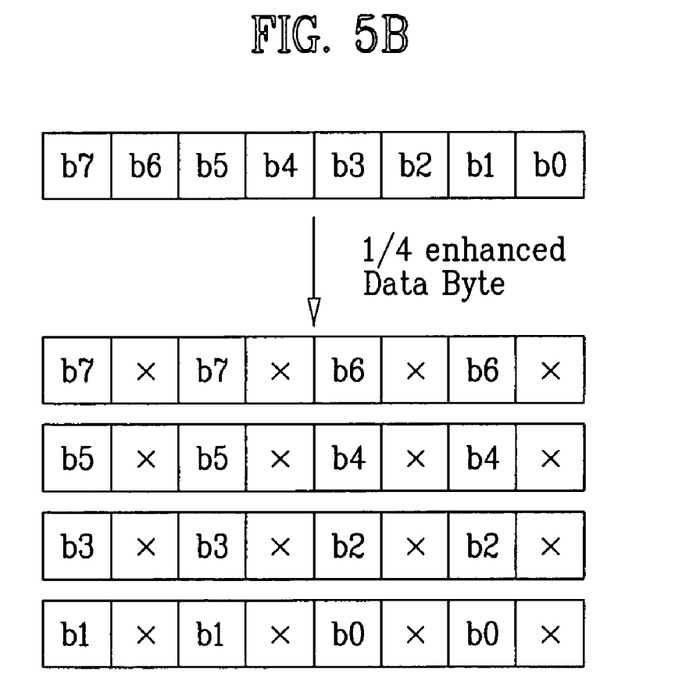
FIG. 5B is an example illustrating null bits inserted into ¼ enhanced data according to the preferred embodiment of the present invention.

FIG. 5A is an example of inserting null bits into ½ enhanced data byte and FIG. 5B is an example of inserting null bits into ¼ enhanced data byte. If ½ enhanced data of one byte is inputted, a predetermined number of null bits are inserted between each bit and the data is expanded to 2 bytes as shown in FIG. 5A. If ¼ enhanced data of one byte is inputted, each bit is repeated two times and a predetermined null bit is inserted between each bit and the data is expanded to 4 bytes as shown in FIG. 5B. Such null bits are replaced with parity bits later by a convolutional coder of a symbol processor 203.

As shown in FIG. 5A, data expanded to 2 bytes by inserting null bits from one byte enhanced data is called ½ enhanced data. In addition, as shown in FIG. 5B, data expanded to 4 bytes by inserting null bits to one byte enhanced data is called ¼ enhanced data. The mux controller 408 and the null bit controller 409 of FIG. 4 has multiplexing and interleaving information to indicate whether the input data is to be encoded at ½ rate or at ¼ rate for packet expansioin of the null bit inserter 406. Therefore, if one byte outputted from the data interleaver 405 is the ½ enhanced data, the data is expanded to 2 bytes and ¼ enhanced data is expanded to 4 bytes.

According to the preferred embodiment, the output of the null bit inserter 406 is provided to the MPEG header inserter 407. The MPEG header inserter 407 inserts 4 byte header per 184 byte unit. This is the same format as that of the MPEG transport packet of the main data. This is to discard the packet after confirming PID is received when the previous VSB receiver receives the enhanced data packet. This provides compatibility with the conventional ATSC VSB receiver. For example, the conventional ATSC VSB receiver that is not available to receive the enhanced data receives the digital communication by selectively choosing MPEG transport packet of main data through PID (Packet Identification) provided in the transport header, and discards the enhanced data packet. The VSB receiver, capable of receiving the enhanced data, demultiplexes MPEG transport data of main data and MPEG transport data of the enhanced data, and processes the demultiplexed enhanced data packet using the multiplexing information.

The enhanced data prepared using the above processes is multiplexed with MPEG transport packet, that is, MPEG video and audio data of main data in segment unit, and outputted to the first encoder 202. Then, the first encoder 202 and the decoder 204 discard the Reed-Solomon parity inserted into the enhanced data before convolutional encoding. The randomizer 202-1 of the first encoder 202 randomizes the multiplexed enhanced data and multiplexed main data. The Reed-Solomon coder 202-2 is used for subjecting the output data of the randomizer 202-1 to Reed-Solomon coding and adding 20 byte parity code to the output data. The data interleaver 202-3 changes the order of the data having the parity code. The symbol processor 203 converts the byte unit data outputted after being interleaved into 2-bit symbol. Preferably, the symbol processor 203 bypasses the main data symbol, performs convolutional encoding to the enhanced data symbol, and converts the convolutional encoded and multiplexed enhanced data symbol into byte unit data and outputs to the first decoder 204.

Among the enhanced data symbols, the upper bit of 2 bits inputted to the trellis coder 104 of the 8 VSB transmitter 100 is used as an information bit and the lower bit gives coding gain by convolutionally encoding the information bit in the symbol processor 203, and transmitting as a parity bit of the information bit.

The output of the symbol processor 203 is inputted to a data deinterleaver 204-1 of the first decoder 204. The data deinterleaver 204-1 performs deinterleaving to the byte unit data in inverse process of the data interleaver 202-3, and outputs the data to a Reed-Solomon parity remover 204-2. The Reed-Solomon parity remover 204-2 outputs the data to the derandomizer 204-3 after discarding Reed-Solomon parity byte added from the Reed-Solomon coder 202-2.

The null bit of the enhanced data symbol is changed to parity bit through ½ convolutional encoding after the Reed-Solomon coder 202-2. Therefore, if it is transmitted as is, an error is generated in the enhanced data packet during Reed-Solomon decoding process in the conventional ATSC 8 VSB receiver.

To prevent this error, Reed-Solomon parity byte corresponding to data converted by the ½ convolutional encoder should be recalculated so as to remain compatibility with the conventional ATSC 8 VSB transmitter.

Therefore, in the Reed-Solomon parity remover 204-2, the Reed-Solomon parity byte added to the first enhanced data (that is, data before the convolution encoding) is removed. In the Reed Solomon encoder 102 of the 8 VSB transmitter 100, the Reed-Solomon parity byte to the convolutionally encoded enhanced data is recalculated and added, and Reed-Solomon parity corresponding to the convolutionally encoded enhanced data is added. Therefore, error is not generated in the enhanced data packet during Reed-Solomon decoding in the ATSC 8 VSB receiver.

The derandomizer 204-3 receives data of which the Reed-Solomon parity is discarded, and performs derandomizing in inverse process of the randomizer 202-1. The 8T-VSB transmitter 100 performs the processes of FIG. 1 from randomizing in order on the data outputted from decoder 204. Preferably, both the data derandomizer 204-3 of the first decoder 204 and the randomizer 101 of the 8 VSB transmitter 100 can be used or omitted.

Multiplexing information for multiplexing ½ enhanced data and ¼ enhanced data in the multiplxer 403 of the enhanced data pre-processor 204 and multiplexing information for multiplexing main data and enhanced data in the multiplexer 305 of the main and enhanced data multiplexer 201 are inserted into a reserved bit in the field synchronizing segment, and transmitted.

Hereinafter, a method of multiplexing ½ enhanced data and ¼ enhanced data in the multiplexer 403 of the enhanced data pre-processor 304 shown in FIG. 4 will be described. The number of ½ enhanced data packet (that is, 164 bytes) and ¼ enhanced data packet (that is, 164 bytes) multiplexed to one VSB data field is defined as H and Q.

In the null bit inserter 406 shown in FIG. 4, if ½ enhanced data packet of one byte is inputted, null bits are inserted and 2 bytes are outputted. Also, if ¼ enhanced data of one byte is inputted, 4 bytes are outputted. Therefore, if only ½ enhanced data is multiplexed and transmitted, the maximum number of H becomes 156(=312/2) because one VSB data field has 312 data segments. On the same principle, if only ¼ enhanced data is transmitted, the maximum number of Q becomes 78(=312/4). That is, if only ½ enhanced data is transmitted, maximum number of 156 packets (1 packet=164 bytes) can be transmitted and if ¼ enhanced data is transmitted, the maximum number of 78 packets (1 packet=164 bytes) can be transmitted. It can be described as the following mathematical formula 1.

$$0 \leq (2H+4Q) \leq 312 \quad \text{[Mathematical Formula 1]}$$

The main data segment (that is, 188 bytes) multiplexed with the enhanced data in the multiplexer 305 is 312-2H-4Q. A method of multiplexing ½ enhanced data packet and ¼ enhanced data packet in the multiplexer 403 of FIG. 4 when the value of H and Q is defined is proposed in accordance with the preferred embodiment of the present invention.

Figure 6A:
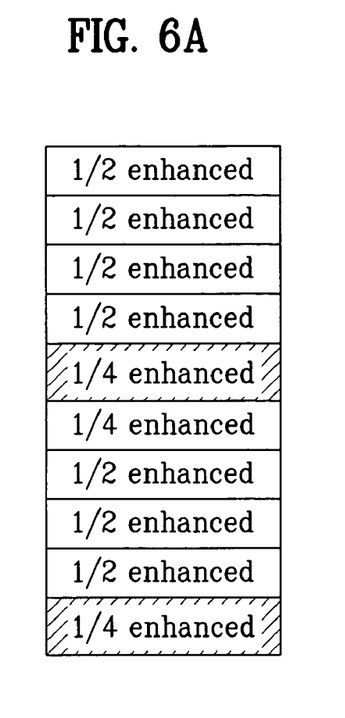
FIG. 6A is an example of uniformly multiplexing ½ enhanced data packet and ¼ enhanced data packet.

A first method is uniformly multiplexing ½ enhanced data packet and ¼ enhanced data packet as illustrated as an example in FIG. 6A. The object is to reduce the timing jitter in MPEG decoder of the VSB receiver. That is, packets are inputted at predetermined intervals in the MPEG decoder of the VSB receiver. It also enables to reduce the size of input buffer of MPEG decoder. In case that packets are burstly inputted in the input buffer of the MPEG decoder, the size of buffer should be increased to prevent overflowing and underflowing. Alternatively, the location of the ¼ enhanced data packet may be else where so long as they are located at predetermined intervals.

Figure 6B:
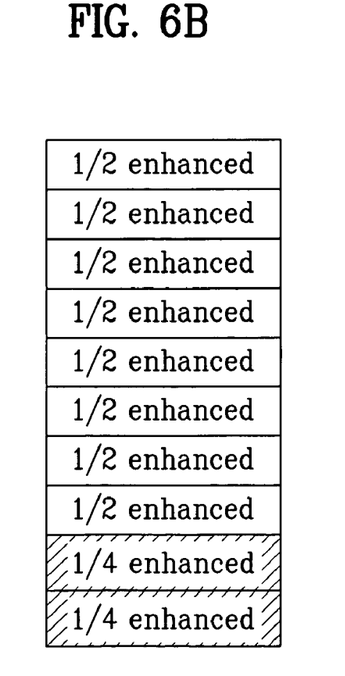
FIG. 6B is an example of multiplexing by grouping ½ enhanced data packet and ¼ enhanced data packet.

A second method is multiplexing by separately grouping ½ enhanced data packet and ¼ enhanced data packet. FIG. 6B shows that ½ enhanced data packets are grouped and outputted, and ¼ enhanced data packets are grouped and outputted from one data field. Here, ¼ enhanced data has better reception performance and is more resistant to noise and channel fading because coding gain of the ¼ enhanced data is larger than that of the ½ enhanced data.

To improve the reception performance of ¼ enhanced data, the ¼ enhanced data symbols inputted to the symbol processor 203 in FIG. 2 should be grouped together and inputted. Accordingly, If ½ enhanced data packet group and ¼ data packet group are multiplexed separately, the reception performance of ¼ enhanced data can be maximized. Although FIG. 6B shows the ¼ enhanced data at the bottom, such data may be located at the top so long as they are grouped together.

Figure 6C:
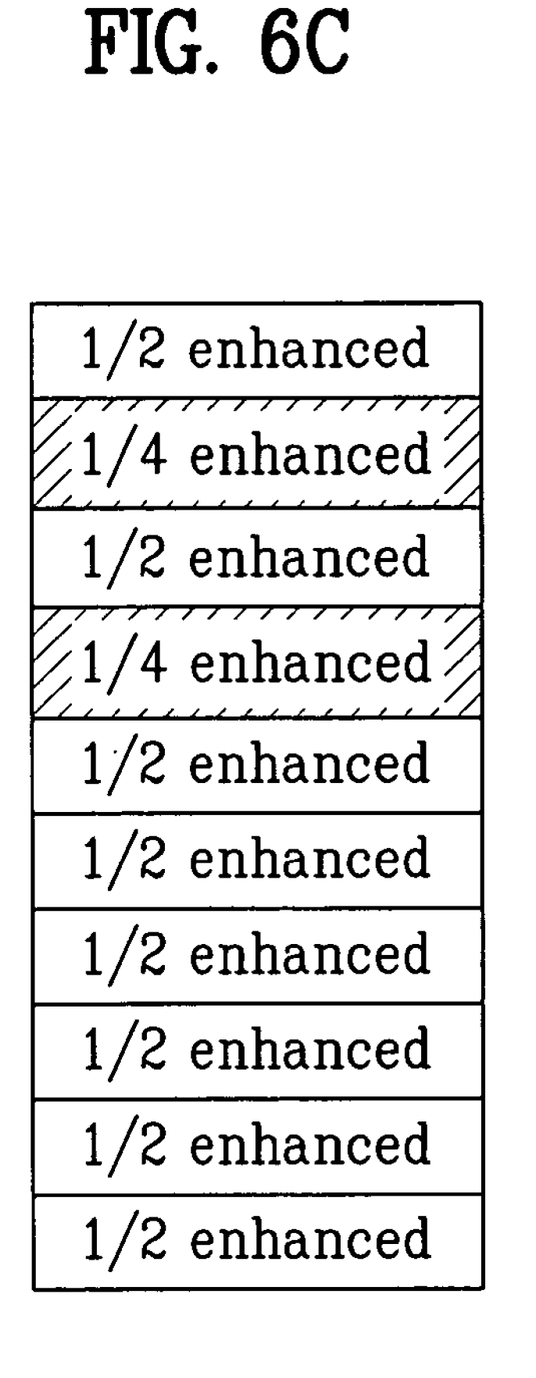
FIG. 6C is an example of alternatively multiplexing ½ enhanced data packet and ¼ enhanced data packet.

A third method is alternatively multiplexing ½ enhanced data packet and ¼ enhanced data packet. FIG. 6C shows that ½ data packets and ¼ data packets are alternatively outputted. This method can be thought as a combined method with the advantage of the first and that of the second method.

If one enhanced data packet completes multiplexing, while multiplexing the ½ enhanced data packet and ¼ enhanced data packet alternatively, the other enhanced data packet continuously multiplexes.

FIGS. 6A-6C show a method of multiplexing ½ enhanced data packet and ¼ enhanced data packet to be transmitted to a VSB data field when H=8 and Q=2. Although the ½ enhanced data packet is multiplexed first in FIGS. 6A and 6C, the ¼ enhanced data packet may be multiplexed first.

The uniform multiplexing can be described as follows. If the number of ¼ enhanced data packet (Q) is smaller than the number of ½ enhanced data packet (H), one ¼ enhanced data packet is multiplexed per Int (H/Q) number of ½ enhanced data packet. Preferably, Int (A) is the largest integer among the numbers less than A. If the number of ½ enhanced data packet is less than the number of ¼ enhanced data packet, one ½ enhanced data packet is multiplexed per int (Q/H) number of ¼ enhanced data packet.

If the number of ½ enhanced data packet and ¼ enhanced data packet is defined, the number of ½ enhanced data packet, the number of ¼ enhanced data packet and enhanced data multiplexing information related to the rules used for multiplexing among the multiplexing methods are inserted into the reserved bit in the field synchronizing segment and transmitted. Such multiplexing information is preferably used in the multiplexer. The multiplexer 403 multiplexes the ½ enhanced data packets and the ¼ enhanced data packets to a rule according to the enhanced data multiplexing information in the field synchronizing segment. Preferably, a fixed rule (one of three described above) may be used for multiplexing. Alternatively, any one of above multiplexing methods may be used depending on the number of ½ enhanced data packets and ¼ enhanced data packets multiplexed to one VSB data field.

If one of above three methods is chosen, the values of H and Q are needed to the enhanced data packet multiplexing information in the field-synchronizing segment in the VSB system of the present invention. However, if more than one multiplexing methods are used selectively, the multiplexing information is added to the enhanced data packet multiplexing information in the field synchronizing segment.

For example, the information indicating the number of ½ enhanced data packet and ¼ enhanced data packet, the information indicating how to be multiplexed, information indicating the number of data segments to be allocated to the enhanced data among the 312 data segments, and the information indicating how the enhanced data and main data are multiplexed are inserted to a data field in a multiplexing information area allocated to the reserved bits in the field synchronizing segment.

If ATSC 8 VSB receiver performs inverse process of the, aforementioned transmission process, all ½ enhanced data packet, ¼ enhanced data packet and main data can be received and processed.

According to the digital VSB transmission system and enhanced data multiplexing method, when a plurality of enhanced data encoded to different codes in addition to the main data (for example, ½ enhanced data packet and ¼ enhanced data) are transmitted, the ½ enhanced data packets and ¼ enhanced data packets are multiplexed according to a predetermined multiplexing rule in response to the number of ½ enhanced data packets and ¼ enhanced data packets. The multiplexed enhanced data is transmitted after being multiplexed with main data according to the multiplexing rule once again.

If the ½ enhanced data packets and the ¼ enhanced data packets are multiplexed in a uniform form, the timing jitter in the MPEG of the VSB receiver can be reduced and also the size of the input buffer in the MPEG decoder of the VSB receiver can be reduced.

If ½ enhanced data packets and ¼ enhanced data packets are separately grouped and multiplexed, the resistance of ¼ enhanced data to noise and channel fading can be maximized because coding gain is larger than ½ enhanced data.

If the ½ enhanced data packets and ¼ enhanced data packets are alternatively multiplexed, not only the timing jitter in the MPEG decoder of the VSB receiver can be reduced but also the reception performance of ¼ enhanced data can be increased.

It will be apparent to one skilled in the art that the preferred embodiments of the present invention can be readily implemented using, for example, a suitably programmed digital signal processor (DSP) or other data processing device, either alone or in combination with external support logic.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The logic implementation according to the preferred embodiments described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital broadcast transmission system for use with main data and first and second enhanced data, the digital broadcast transmission system comprising:
    a multiplexer unit for multiplexing a first enhanced data packet and a second enhanced data packet according to a first predetermined multiplexing rule, subjecting the multiplexed first and second enhanced data packet to a forward error correction code to produce formatted enhanced data, and multiplexing the formatted enhanced data and the main data in response to a second predetermined multiplexing rule;
    a first encoder in communication with the multiplexer unit for performing data randomizing, parity supplementing and data interleaving to a data packet output from the multiplexer unit;
    a symbol processor in communication with the first encoder for converting the data packet output from the first encoder to a plurality of symbols, encoding only enhanced data symbols at a rate of 1/L, L being an integer equal to or greater than 2, and converting the symbols to byte unit data;
    a first decoder for deinterleaving the byte unit data output from the symbol processor, removing parity data added by the first encoder from the deinterleaved byte unit data, and derandomizing the parity-removed data; and
    a transmitter including a trellis coder for performing parity supplementing, data interleaving, and trellis coding to the data output from the first decoder to produce a converted data packet and transmitting the converted data packet,
    wherein the first enhanced data is encoded at a code rate of 1/M, M being an integer equal to or greater than 2, and the second enhanced data is encoded at a code rate of 1/N, N being an integer greater than M,
    wherein a number of the first enhanced data packets is defined as 'H', and a number of the second enhanced data packets is defined as 'Q', such that the first and the second enhanced data packets are multiplexed in one data field in accordance with $0 \leq (MH+NQ) \leq K$, wherein K is a number of data segments in one data field.

2. The digital broadcast transmission system of claim 1, wherein the forward error correction code is a Reed-Solomon code.

3. The digital broadcast transmission system of claim 1, wherein the multiplexer unit includes a pre-processor for multiplexing the first enhanced data and the second enhanced data according to the first predetermined multiplexing rule that is at least responsive to a field synchronizing signal and a location control signal that corresponds to locations of the first and the second enhanced data.

4. The digital broadcast transmission system of claim 1, wherein the multiplexer unit comprises:
    a main data buffer for temporarily storing the main data input in a packet of X-byte unit and generating a main data packet;
    a first enhanced data buffer for storing the first enhanced data input in a packet of X-byte unit;
    a second enhanced data buffer for storing the second enhanced data input in a packet of X-byte unit;
    a pre-processor for multiplexing the first enhanced data output from the first enhanced data buffer, and the second enhanced data output from the second enhanced data buffer into a packet unit according to the first predetermined multiplexing rule, and converting the data to a Moving Picture Experts Group (MPEG) transport packet format to generate an enhanced data packet; and
    a second multiplexer for multiplexing the main data packet output from the main data buffer and the enhanced data packet output from the pre-processor into a segment unit according to the second predetermined multiplexing rule.

5. The digital broadcast transmission system of claim 4, wherein the second multiplexer inserts information for the number of the first and second enhanced data packets and information for the second predetermined multiplexing rule into a reserved bit of a field synchronizing segment as main and enhanced data multiplexing information if the second predetermined multiplexing rule for the first and second enhanced data is determined, and then multiplexes the main and the enhanced data packets according to the second predetermined multiplexing rule.

6. The digital broadcast transmission system of claim 4, wherein the pre-processor comprises:
    a first packet converter for converting the first enhanced data input in the packet of X-byte unit into a first enhanced data packet of Y-byte unit;
    a second packet converter for dividing the second enhanced data input in the packet of X-byte unit into a second enhanced data packet of Y-byte unit;
    a first multiplexer for multiplexing the first and second enhanced data packets of Y-byte unit, output from the first and second packet converters, in response to multiplexing information in a field synchronizing signal, and generating second multiplexed enhanced data;
    an error correction coder and data interleaver for performing forward error correction coding to the second multiplexed enhanced data and generating interleaved enhanced data;
    a null bit inserter for inserting at least one null bit to the interleaved enhanced data; and
    a Moving Picture Experts Group (MPEG) header inserter for inserting a Moving Picture Experts Group (MPEG) header to data output from the null bit inserter.

7. The digital broadcast transmission system of claim 6, wherein the first multiplexer performs the multiplexing process by separately grouping the first and second enhanced data packets in one data field.

8. The digital broadcast transmission system of claim 6, wherein the first multiplexer alternately multiplexes the first and second enhanced data packets.

9. The digital broadcast transmission system of claim 8, wherein the first multiplexer alternately multiplexes the first and second enhanced data packets, and multiplexes and outputs only the second enhanced data packet when one of the enhanced data packets is completely multiplexed.

10. The digital broadcast transmission system of claim 6, wherein the first multiplexer inserts information for the number of the first and second enhanced data packets, transmitted in one data field, and information for the first predetermined multiplexing rule into a reserved bit of a field synchronizing segment as enhanced data multiplexing information, and then multiplexes the first and second enhanced data according to the first predetermined multiplexing rule.

11. The digital broadcast transmission system of claim 6, wherein the null bit inserter outputs 2 bytes encoded at a code rate of 1/2 by inserting a predetermined null bit in between each bit if the first enhanced data of 1 byte is input, and the null bit inserter outputs 4 bytes encoded at a code rate of 1/4 by repeating each bit twice, and inserting a predetermined null bit in between each bit if the second enhanced data of 1 byte is input.

12. The digital broadcast transmission system of claim 1, wherein the first and second enhanced data packets are multiplexed in the data field at a uniform interval.

13. The digital broadcast transmission system of claim 12, wherein each second enhanced data packet is multiplexed per Int(H/Q) numbered first enhanced data packets at the uniform interval if Q is less than H.

14. The digital broadcast transmission system of claim 12, wherein each first enhanced data packet is multiplexed per Int(Q/H) numbered second enhanced data packets at the uniform interval if H is less than Q.

15. The digital broadcast transmission system of claim 1, wherein the symbol processor performs 1/2 convolutional encoding to an information bit of enhanced data, for generating a parity bit, and then outputs an information bit, which is not convolutionally encoded, as a high bit of the trellis coder, and the parity bit as a low bit of the trellis coder.

16. A method for combining first and second enhanced data with main data in a digital broadcast transmission system, the method comprising:

multiplexing the first and second enhanced data with the main data in a multiplexer unit comprising at least first and second multiplexers, the first multiplexer multiplexing a first enhanced data packet and a second enhanced data packet according to a first predetermined multiplexing rule, subjecting the multiplexed first and second enhanced data packet to a forward error correction code to produce formatted enhanced data, and the second multiplexer multiplexing the formatted enhanced data and the main data in response to a second predetermined multiplexing rule;

encoding an output of the multiplexer unit in a first encoder in communication with the multiplexer unit by performing data randomizing, parity supplementing and data interleaving to a data packet output from the first and second multiplexers;

converting the data packet output from the first encoder to a plurality of symbols in a symbol processor, encoding only enhanced data symbols at a rate of 1/L, L being an integer equal to or greater than 2, and converting the symbols to byte unit data; and decoding the byte unit data in a first decoder by deinterleaving the byte unit data output from the symbol processor, removing parity data added by the first encoder from the deinterleaved byte unit data, and derandomizing the parity-removed data, wherein the first enhanced data is encoded at a code rate of 1/M, M being an integer equal to or greater than 2, and the second enhanced data is encoded at a code rate of 1/N, N being an integer greater than M, wherein a number of the first enhanced data packets is defined as 'H', and a number of the second enhanced data packets is defined as 'Q', such that the first and the second enhanced data packets are multiplexed in one data field in accordance with $0 \leq (MH+NQ) \leq K$, wherein K is a number of data segments in one data field.

17. The method of claim 16, wherein the multiplexer unit includes a pre-processor for multiplexing the first enhanced data and the second enhanced data according to the first predetermined multiplexing rule that is at least responsive to a field synchronizing signal and a location control signal that corresponds to locations of the first and the second enhanced data.

18. The method of claim 16, wherein the first multiplexer multiplexes the first and second enhanced data packets at a uniform interval.

19. The method of claim 18, wherein the first multiplexer multiplexes each second enhanced data packet per Int(H/Q) numbered first enhanced data packets at the uniform interval if Q is less than H.

20. The method of claim 18 wherein the first multiplexer multiplexes each first enhanced data packet per Int(Q/H) numbered second enhanced data packets at the uniform interval if H is less than Q.

21. The method of claim 16, wherein the first multiplexer performs the multiplexing process by separately grouping the first and second enhanced data packets in one data field.

22. The method of claim 16, wherein the first multiplexer alternately multiplexes the first and second enhanced data packets.

23. The method of claim 22, wherein the first multiplexer alternately multiplexes the first and second enhanced data packets, and multiplexer and outputs only the second enhanced data packet when one of the enhanced data packets is completely multiplexed.

24. The method of claim 16, wherein the first multiplexer inserts information for the number of the first and second enhanced data packets, transmitted in one data field, and information for the first predetermined multiplexing rule into a reserved bit of a field synchronizing segment as enhanced data multiplexing information, and then multiplexes the first and second enhanced data according to the first predetermined multiplexing rule.

25. The method of claim 16, wherein the second multiplexer inserts information for the number of the first and second enhanced data packets and information for the second predetermined multiplexing rule into a reserved bit of a field synchronizing segment as main and enhanced data multiplexing information if the multiplexing rule for the first and second enhanced data is determined, and then multiplexes the main and enhanced data packets according to the second predetermined multiplexing rule.

26. A multiplexer unit of a digital broadcast transmission system for use with main data and first and second enhanced data, the multiplexer unit comprising:

a main data buffer for temporarily storing main data input in a packet of X-byte unit and generating a main data packet;

a first enhanced data buffer for storing first enhanced data input in a packet of X-byte unit;

a second enhanced data buffer for storing second enhanced data input in a packet of X-byte unit;

a pre-processor comprising a first multiplexer for multiplexing the first enhanced data output from the first enhanced data buffer, and the second enhanced data output from the second enhanced data buffer into a packet unit according to a first predetermined multiplexing rule, and converting the multiplexed packet unit data to a Moving Picture Experts Group (MPEG) transport packet format to generate an enhanced data packet; and a second multiplexer for multiplexing the main data packet output from the main data buffer and the enhanced data packet output from the pre-processor into a segment unit according to a second predetermined multiplexing rule, wherein the first enhanced data is encoded at a code rate of 1/M, M being an integer equal to or greater than 2, and the second enhanced data is encoded at a code rate of 1/N, N being an integer greater than M, wherein a number of the first enhanced data packets is defined as 'H', and a number of the second enhanced data packets is defined as 'Q', such that the first and the second enhanced data packets are multiplexed in one data field in accordance with $0 \leq (MH+NQ) \leq K$, wherein K is a number of data segments in one data field.

27. The multiplexer unit of claim 26, wherein the pre-processor comprises:

a first packet converter for converting the first enhanced data input in the packet of X-byte unit into a first enhanced data packet of Y-byte unit;

a second packet converter for dividing the second enhanced data input in the packet of X-byte unit into a second enhanced data packet of Y-byte unit;

a first multiplexer for multiplexing the first and second enhanced data packets of Y-byte unit, output from the first and second packet converters, in response to multiplexing information in a field synchronizing signal, and generating second multiplexed enhanced data;

an error correction coder and data interleaver for performing forward error correction coding to the second multiplexed enhanced data and generating interleaved enhanced data;

a null bit inserter for inserting at least one null bit to the interleaved enhanced data; and a Moving Picture Experts Group (MPEG) header inserter for inserting a Moving Picture Experts Group (MPEG) header to data output from the null bit inserter.

28. The multiplexer unit of claim 27, wherein the first multiplexer performs the multiplexing process by separately grouping the first and second enhanced data packets in one data field.

29. The multiplexer unit of claim 27, wherein the first multiplexer alternately multiplexes the first and second enhanced data packets.

30. The multiplexer unit of claim 29, wherein the first multiplexer alternately multiplexes the first and second enhanced data packets, and multiplexes and outputs only the second enhanced data packet when one of the enhanced data packets is completely multiplexed.

31. The multiplexer unit of claim 26, wherein the first multiplexer multiplexes the first and second enhanced data packets at a uniform interval.

32. The multiplexer unit of claim 31, wherein the first multiplexer multiplexes each second enhanced data packet per Int(H/Q) numbered first enhanced data packets at the uniform interval if Q is less than H.

33. The multiplexer unit of claim 31, wherein the first multiplexer multiplexes each first enhanced data packet per Int(Q/H) numbered second enhanced data packets at the uniform interval if H is less than Q.

34. A digital broadcast transmission system for use with main data and first and second enhanced data, the digital broadcast transmission system comprising:

a multiplexer unit for multiplexing a first enhanced data packet and a second enhanced data packet according to a first predetermined multiplexing rule, subjecting the multiplexed first and second enhanced data packet to a forward error correction code to produce formatted enhanced data, and multiplexing the formatted enhanced data and the main data in response to a second predetermined multiplexing rule;

a first encoder in communication with the multiplexer unit for performing parity supplementing to a data packet output from the main and enhanced data multiplexer unit;

a symbol processor in communication with the first encoder for converting the data packet output from the first encoder to a plurality of symbols, encoding only enhanced data symbols at a rate of 1/L, L being an integer equal to or larger than 2, and converting the symbols to byte unit data;

a first decoder for removing parity data added by the first encoder from the byte unit data output from the symbol processor; and a transmitter for performing parity supplementing to the data output from the first decoder to produce a converted data packet and transmitting the converted data packet wherein the first enhanced data is encoded at a code rate of 1/M, M being an integer equal to or greater than 2, and the second enhanced data is encoded at a code rate of 1/N, N being an integer greater than M, wherein a number of the first enhanced data packets is defined as 'H', and a number of the second enhanced data packets is defined as 'Q', such that the first and the second enhanced data packets are multiplexed in one data field in accordance with $0 \leq (MH+NQ) \leq K$, wherein K is a number of data segments in one data field.

35. A method for combining first and second enhanced data with main data in a digital broadcast transmission system, the method comprising:

multiplexing the first and second enhanced data with the main data in a main and enhanced data multiplexer unit comprising at least first and second multiplexers, wherein multiplexing the first and second enhanced data with the main data comprises:

multiplexing a first enhanced data packet and a second enhanced data packet in the first multiplexer according to a first predetermined multiplexing rule, subjecting the multiplexed first and second enhanced data packet to a forward error correction code to produce formatted enhanced data, and multiplexing the formatted enhanced data and the main data in the second multiplexer in response to a second predetermined multiplexing rule;

encoding an output of the multiplexer unit in a first encoder in communication with the main and enhanced data multiplexer unit for by performing parity supplementing to a data packet output from the main and enhanced data multiplexer unit;

converting the data packet output from the first encoder to a plurality of symbols in a symbol processor, encoding only enhanced data symbols at a rate of 1/L, L being an integer equal to or larger than 2, and converting the symbols to byte unit data; and decoding the byte unit data in a first decoder by removing parity data added by the first encoder from the byte unit data output from the symbol processor wherein the first enhanced data is encoded at a code rate of 1/M, M being an integer equal to or greater than 2, and the second enhanced data is encoded at a code rate of 1/N, N being an integer greater than M, wherein a number of the first enhanced data packets is defined as 'H', and a number of the second enhanced data packets is defined as 'Q', such that the first and the second enhanced data packets are multiplexed in one data field in accordance with $0 \leq (MH+NQ) \leq K$, wherein K is a number of data segments in one data field.

36. A broadcast transmitting method comprising:

pre-processing first and second enhanced data by coding the first enhanced data at a first rate of 1/M and by coding the second enhanced data at a second rate of 1/N for first forward error correction (FEC) in order to reduce errors in the first and second enhanced data during data transmission, M being different from N;

multiplexing first and second enhanced data packets including the pre-processed first and second enhanced data, respectively, with main data according to a predetermined multiplexing rule;

coding the multiplexed data for second forward error correction (FEC) in order to reduce errors in the pre-processed first and second enhanced data and in the main data that occur during data transmission; and modulating the FEC-coded main and enhanced data for data transmission, wherein a number of the first enhanced data packets is defined as 'H', and a number of the second enhanced data packets is defined as 'Q', such that the first and the second enhanced data packets are multiplexed in one data field in accordance with $0 \leq (MH+NQ) \leq K$, wherein K is a number of data segments in one data field.

37. The method of claim 36, wherein pre-processing first and second enhanced data comprises inserting MPEG headers to the first and second enhanced data coded for the first FEC in order to form MPEG transport packets.

38. The method of claim 36, wherein pre-processing first and second enhanced data comprises reordering the first and second enhanced data coded for the first FEC.

39. A broadcast transmitter comprising:

an enhanced data pre-processor configured to pre-process first and second enhanced data by coding the first enhanced data at a first rate of 1/M and by coding the second enhanced data at a second rate of 1/N for first forward error correction (FEC) in order to reduce errors in the first and second enhanced data during data transmission, M being different from N;

a multiplexer configured to multiplex first and second enhanced data packets including the pre-processed first and second enhanced data, respectively, with main data according to a predetermined multiplexing rule;

a forward error correction (FEC) coder configured to code the multiplexed data for second forward error correction (FEC) in order to reduce errors in the pre-processed first and second enhanced data and in the main data during data transmission; and a modulator configured to modulate the FEC-coded main and enhanced data for data transmission, wherein a number of the first enhanced data packets is defined as 'H', and a number of the second enhanced data packets is defined as 'Q', such that the first and the second enhanced data packets are multiplexed in one data field in accordance with $0 \leq (MH+NQ) \leq K$, wherein K is a number of data segments in one data field.

40. The broadcast transmitter of claim 39, wherein the enhanced data pre-processor comprises an MPEG header inserter configured to insert MPEG headers to the first and second enhanced data coded for the first FEC in order to form MPEG transport packets.

* * * * *